(12) United States Patent
Pridgen

(10) Patent No.: US 7,296,538 B1
(45) Date of Patent: Nov. 20, 2007

(54) DEER FEEDER

(76) Inventor: Walter G. Pridgen, 8549 Mill Branch Rd., Rocky Mount, NC (US) 27803-8703

(*) Notice: Subject to any disclaimer, the term of this patent is extended or adjusted under 35 U.S.C. 154(b) by 241 days.

(21) Appl. No.: 11/125,707

(22) Filed: May 10, 2005

(51) Int. Cl.
*A01K 1/04* (2006.01)

(52) U.S. Cl. .......................................... 119/59; 119/68

(58) Field of Classification Search ............... 119/59, 119/68, 65, 66, 67, 69, 57.91, 51.01, 51.03; 248/311.2, 313; 135/118
See application file for complete search history.

(56) References Cited

U.S. PATENT DOCUMENTS

| | | | | |
|---|---|---|---|---|
| 3,675,783 A * | 7/1972 | Reese | ...................... | 211/85.19 |
| 3,734,439 A * | 5/1973 | Wintz | ..................... | 248/224.51 |
| 3,892,315 A * | 7/1975 | Johnson | ................... | 211/85.19 |
| 5,106,046 A * | 4/1992 | Rowles et al. | ........... | 248/311.2 |
| 5,213,294 A * | 5/1993 | DeBord | ....................... | 248/147 |
| 5,320,263 A * | 6/1994 | Kobylack | .................. | 224/274 |
| 5,620,059 A * | 4/1997 | Crispeno | .................... | 182/127 |
| 5,823,135 A * | 10/1998 | Gilchrist et al. | .......... | 119/52.2 |
| 5,823,496 A * | 10/1998 | Foley et al. | ................ | 248/314 |
| 5,842,671 A * | 12/1998 | Gibbs | .................... | 248/231.41 |
| 5,996,957 A * | 12/1999 | Kurtz | ...................... | 248/311.2 |
| 6,231,058 B1 * | 5/2001 | Kimbrough et al. | ... | 280/33.992 |
| 6,386,142 B1 * | 5/2002 | Holscher et al. | ........... | 119/57.8 |
| 6,439,517 B1 * | 8/2002 | Applegate | ................... | 248/154 |
| 6,592,180 B2 * | 7/2003 | Combs | ................... | 297/188.14 |
| 6,637,447 B2 * | 10/2003 | McMullin et al. | ............ | 135/16 |
| 6,766,912 B1 * | 7/2004 | Gibbs | .......................... | 211/74 |
| 6,802,484 B1 * | 10/2004 | Kiley et al. | .............. | 248/311.2 |
| 6,929,229 B1 * | 8/2005 | Palmby | ................... | 248/311.2 |

FOREIGN PATENT DOCUMENTS

GB    2120856 A * 12/1983

* cited by examiner

*Primary Examiner*—Yvonne R. Abbott
(74) *Attorney, Agent, or Firm*—Coats & Bennett, P.L.L.C.

(57) ABSTRACT

A deer feeder for holding a food container such as a jar of peanut butter. The deer feeder includes a support structure that extends upwardly from the ground and a food container holder, in the form of a sleeve, mounted to an upper portion of the support. The food container holder includes a pair of stops with at least one of the stops being movable between first and second positions. When the food container is opened and placed within the food container holder, the stops engage the food container and prevent the food container from falling from the food container holder or from being pushed from the food container holder.

18 Claims, 4 Drawing Sheets

DEER FEEDER

FIELD OF THE INVENTION

The present invention relates to deer feeders, and more particularly to a deer feeder that is designed to hold a food container such as a jar of peanut butter.

BACKGROUND OF THE INVENTION

Game feeders are used to feed a variety of species ranging from large animals, such as deer, to fur-bearing animals. There are many disadvantages to current game feeders. In some cases the designs inherently make the feeder visible. In other cases, game feeders are difficult to set up and difficult to fill or load.

In the case of deer, it is known that deer are attracted to certain containerized foods such as peanut butter. However, it is difficult to properly position peanut butter in the wild to effectively attract deer. First, it is desirable to place the food container in a proper location where deer can access the feeder. Further, it is important to station and hold the food container such that the food container does not separate from the feeder. Further, it is important to protect the food container when held such that animals, such as squirrels and the like, cannot access the food product. Therefore, there has been and continues to be a need for a deer feeder that is adaptive to hold and support an open food container such that deer can easily access the food container.

SUMMARY OF THE INVENTION

The present invention entails a deer feeder that holds a food container, such as a jar of peanut butter in a position where food container within the food container can be easily accessed by deer.

In addition, the present invention entails a method for feeding deer with food contained within the food container where the food container is held in an elevated position above the ground and opened such that a deer can gain access to food contained within the food container.

In one particular embodiment, the present invention entails a deer feeder for holding a deer feeder such as a jar of peanut butter. The deer feeder includes a support that extends upwardly from the ground surface. A food container holder is mounted on the support for receiving and holding the food container. In one particular embodiment, the food container holder is angled at least slightly downwardly such that an open portion of the food container faces at least slightly downwardly to where a deer can easily gain access to the food contained therein.

In one particular embodiment, the deer feeder of the present invention includes an elongated post that is designed to be extended into the ground. Secured to an upper portion of the post is a food container holder that is adapted to receive a food container such as a jar of peanut butter. When the food container is open and held within the food container holder, the contents of the food container are accessible to a deer.

Other objects and advantages of the present invention will become apparent and obvious from a study of the following description and the accompanying drawings which are merely illustrative of such invention.

DESCRIPTION OF EXEMPLARY EMBODIMENT

Figure 1:
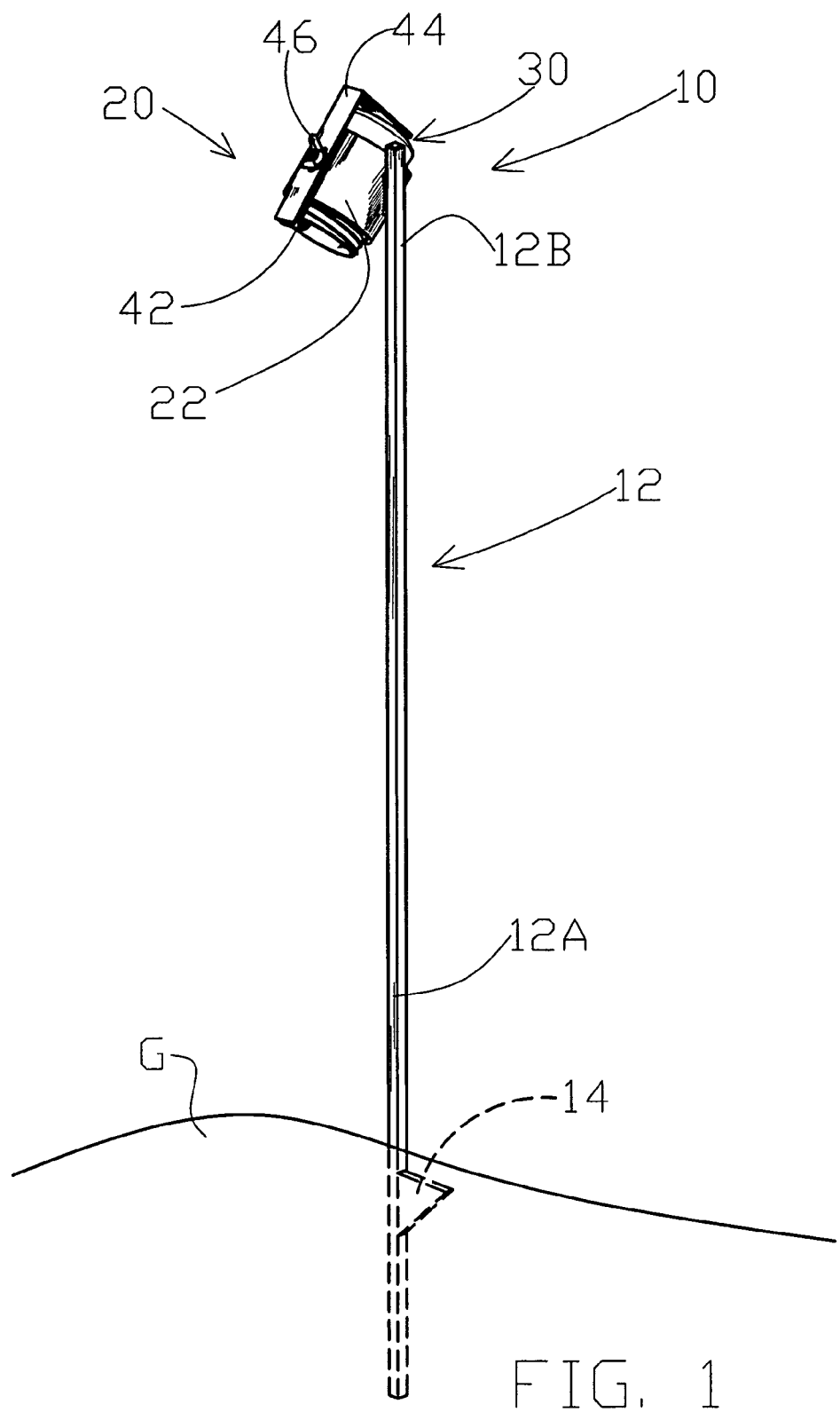
FIG. 1 is a perspective view of the deer feeder inserted into and supported over a ground surface.

With further reference to the drawings, the deer feeder of the present invention is shown therein and indicated generally by the numeral 10. As seen in the drawings, deer feeder 10 basically comprises a support structure 12 that extends upwardly from the ground and which supports a food container holder indicated generally by the numeral 20. As will be appreciated from subsequent portions of the disclosure, food container holder 20 is adapted to receive and hold a container of food. Once positioned within the food container holder 20, the container of food is open about a portion thereof such that deer can access food contained therein.

Turning to a more detailed discussion of deer feeder 10, the support structure in the case of the embodiment shown includes an elongated post 12. Post 12 can be constructed of metal or any other suitable material. Post 12 is designed to be staked or driven into the ground G such that the post 12 extends generally vertically above the ground G. Post 12 includes a bottom portion 12A and a top portion 12B. Bottom portion 12A may include a terminal end that is formed in a spike to facilitate driving the post 12 into the ground G.

Disposed about the lower portion of the deer feeder 10 is an anti-rotation member 14. In the case of the design illustrated, the anti-rotation member 14 extends outwardly from the bottom portion 12A of the post 12. Anti-rotation member 14 can assume various sizes and shapes and can be positioned at numerous points along the lower portion 12A of the post. The important point is that the anti-rotation member 14 should be positioned on the post 12 such that when the post 12 is installed in the ground G the anti-rotation member 14 will assume a position within the ground. As those skilled in the art will appreciate, when a deer feeds from the deer feeder 10 it is possible for the engagement between the deer and the deer feeder 10 to result in the post tending to rotate. The purpose of the anti-rotation member 14 is to retard or minimize this rotation.

Secured to the top portion 12B of the post 12 is the food container holder 20. As discussed above, food container holder 20 is designed to receive and hold a food container. In the embodiment illustrated herein, the food container holder 20 assumes the form of a sleeve and the sleeve includes a cylindrical wall 22 and a lower open end 24 and an upper open end 26. The area internally of the cylindrical wall 22 is open for receiving and holding a food container.

Food container holder 20 is sized to hold a food container. In the example illustrated herein, the food container is indicated generally by the numeral 30 and could be a jar of peanut butter or other container with food container therein. In any event, the food container 30 includes a bottom 32 and a surrounding sidewall structure 34. In addition, the food container 30 would include a top (not shown). In the example illustrated herein, the top has been removed so as to leave exposed a rim 36.

Figure 2:
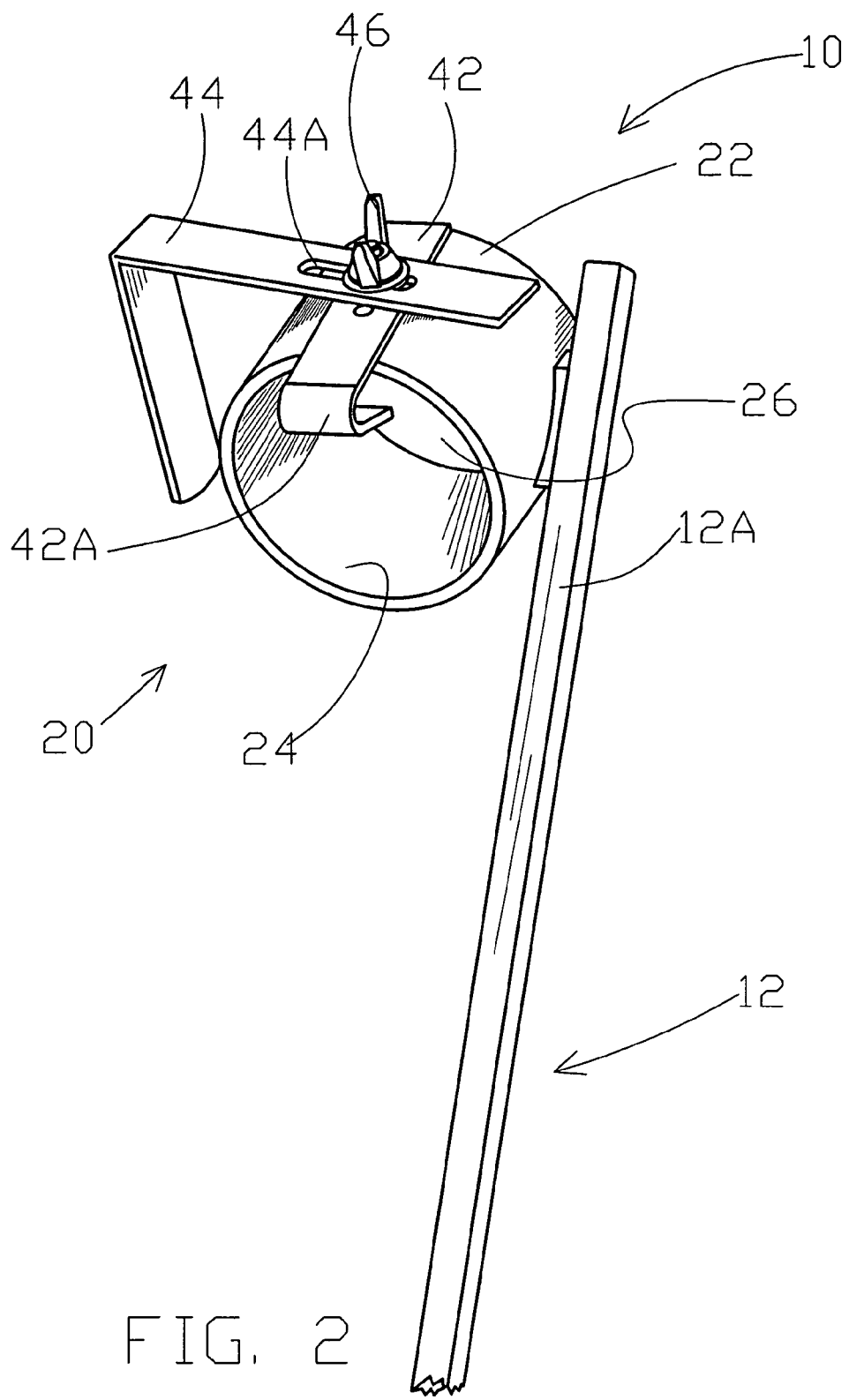
FIG. 2 is a fragmentary perspective view showing a portion of the food container holder that forms a part of the deer feeder.
Figure 3:
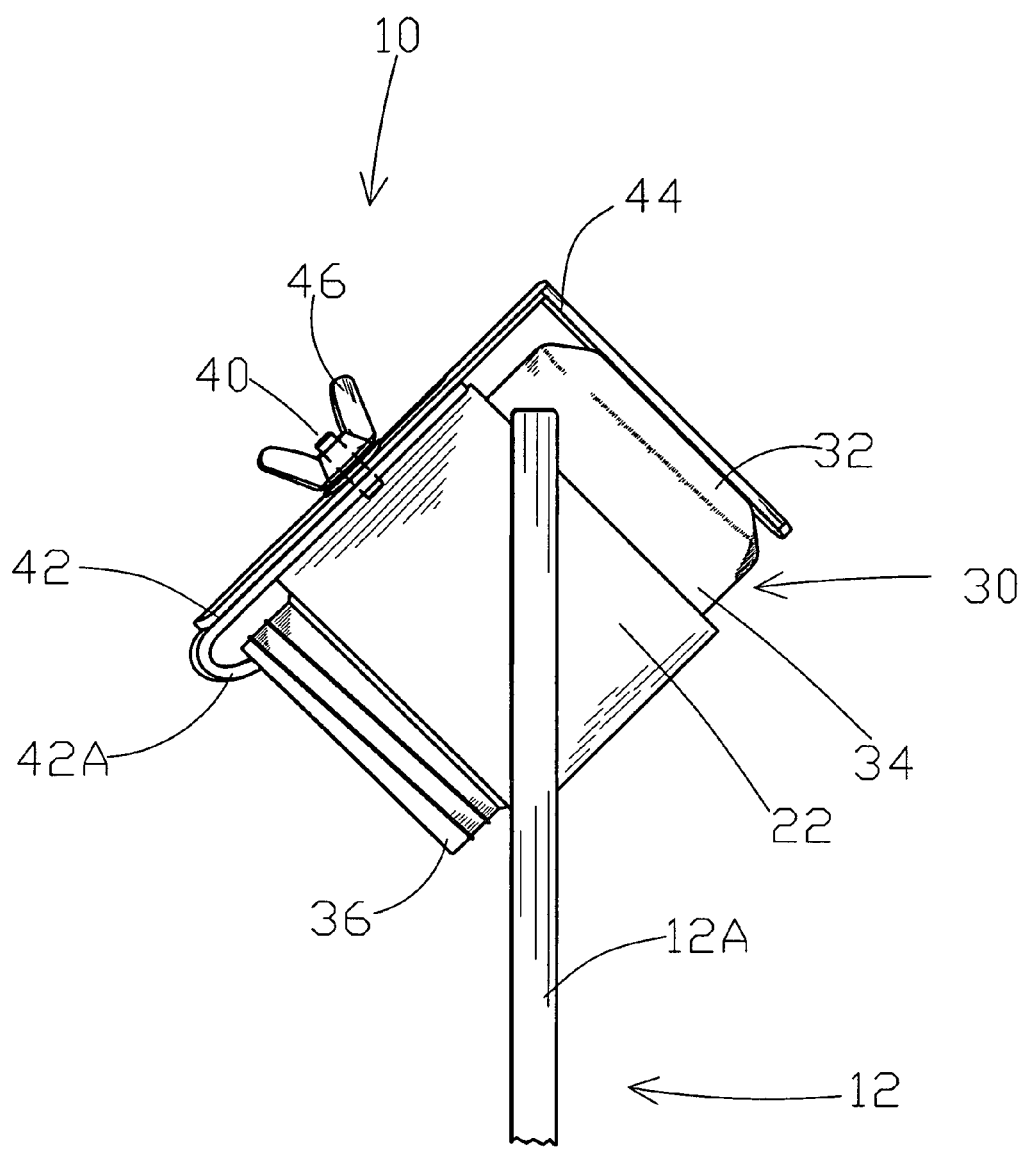
FIG. 3 is a fragmentary side elevational view showing the food container holder holding a container of food.

To hold and retain the food container 30 within the food container holder 20, there is provided one or more stops. In the case of the present embodiment, there is provided two stops, one stop disposed about one end of the food container holder 20 and another stop disposed about the other end of the food container holder. More particularly, there is provided a threaded shaft 40 that extends outwardly from the sidewall 22 of the container holder 20. A first stop 42 includes an opening through which the threaded shaft 40 extends. As best illustrated in FIGS. 2 and 3, the first stop 42 includes a terminal end 42A that is turned or hooked such that when appropriately positioned on the food container holder, the terminal end 42A extends around the rim 36 of the food container 30. Thus, because of the orientation of the food container holder 20, the first stop 42 prevents the food container from falling from the holder 20. A second stop 84 is also provided. The second stop is an L-shaped stop that includes an elongated slot 44A provided therein. Threaded shaft 40 extends upwardly through the opening in the first stop 42 and on through the elongated slot 44A formed in the second stop 44. A wing nut 46 is screwed onto the terminal end of the threaded shaft 40.

Second stop 44 can assume various positions. In this case, second stop 44 is shown in the first position in FIG. 2. This allows the food container 30, such as a jar of peanut butter, to be inserted downwardly through the opening 26 formed in the holder 20. Once the food container 30 has been inserted into the holder 20, then the second stop 44 can be rotated from the position shown in FIG. 2 to the position shown in FIG. 3. Once in the position shown in FIG. 3, the second stop 44 can be adjusted downwardly to where the top portion of the stop engages the bottom 32 of the food container. When the food container 30 is properly inserted and held in the holder 20, the lower terminal end 42A of the first stop 42 will curl around the top rim 36 of the container 30. Thus, stop 42 effectively prevents the food container 30 from sliding or otherwise moving downwardly from the holder 20. Likewise, when the second stop is in the second position, as shown in FIG. 3, the stop abuts against the bottom 32 of the container 30. This will prevent the food container 30 from being pushed out the end 26 of the container by a deer engaging the container 30 or the contents thereof.

Figure 4:
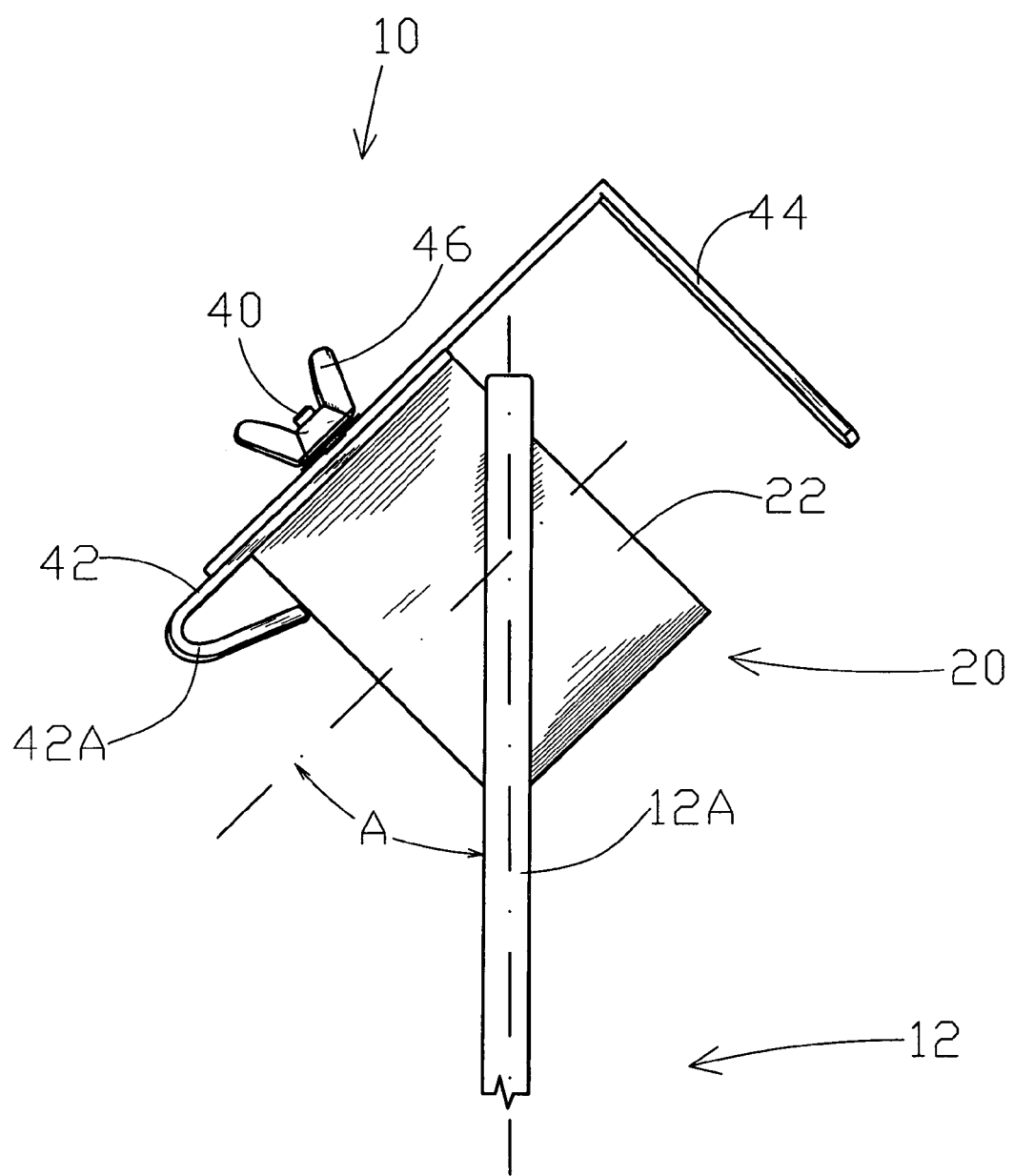
FIG. 4 is a fragmentary side elevational view showing the angular orientation of the food container holder with respect to the post of the deer feeder.

As seen in the drawings, the sleeve or holder 20 is disposed at an angle to the axis of the post 12. This is illustrated in FIG. 4. Note that the axis of the holder 20 forms and angle, designated by A, with the axis of the post 12. Angle A can vary. In the particular embodiment illustrated herein, angle A assumes an angle of approximately 45°. However, it is contemplated that angle A can vary, for example, between approximately 20° and 70°.

From the foregoing discussion, it is appreciated that the deer feeder of the present invention provides a means for supporting and holding a containerized food product. The design of the deer feeder is relatively simply and cost effective and can be easily transported from one location to another location.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A deer feeder, comprising:
   a. an elongated post having an axis and a ground engaging portion for being inserted into the ground;
   b. the elongated post when inserted in the ground having an upper end portion;
   c. an anti-rotating member secured to the post and extending outwardly therefrom for retarding the rotation of the post when the deer feeder is being engaged by a deer;
   d. a sleeve secured to the upper portion of the post and having an axis that forms an acute angle with respect to the axis of the post;
   e. the sleeve including an open lower end and an open upper end;
   f. the sleeve sized to receive a food container having a bottom and a surrounding sidewall;
   g. a first stop secured adjacent the open lower end of the sleeve for engaging the container and preventing the container from falling from the sleeve;
   h. a second stop disposed adjacent the open upper end of the sleeve for engaging the container and preventing the container from being pushed through the sleeve and out of the open upper end thereof; and
   i. wherein the first stop or second stop is movable with respect to the sleeve between first and second positions, in the first position the first or second stop assumes a position that permits the container to be inserted into the sleeve and in the second position the first or second stop engages the container or prevents the container from exiting the sleeve.

2. The deer feeder of claim 1 wherein the second stop is pivotally mounted for movement between the first and second positions and wherein in the second position the first stop lies adjacent the upper open end of the sleeve and prevents the food container from being pushed out the upper end of the sleeve.

3. The deer feeder of claim 2 including a threaded shaft secured to the sleeve and extending outwardly from an outer surface of the sleeve; and wherein the first and second stops are secured on the threaded shaft and wherein the second stop is pivotally mounted on the threaded shaft and movable between the first and second positions.

4. The deer feeder of claim 1 wherein the first stop is disposed adjacent the lower open end of the sleeve and includes a terminal end portion that turns and extends around a rim portion of the container when the container assumes an open state.

5. The deer feeder of claim 1 wherein the sleeve includes a cylindrical wall that is secured to the post such that at least a portion of the cylindrical wall extends below an upper terminal end portion of the post.

6. A deer feeder for holding a food container such as a jar of peanut butter, comprising: a support that extends upwardly from a ground surface; a container holder mounted on the support for receiving and holding the food container; and wherein the container holder is angled downwardly such that when the food container is inserted into the container holder an open top portion of the container faces generally downwardly; wherein the container holder includes opposed open ends and wherein the container can be inserted into the container holder through at least one of the open ends; and first and second container stops, one stop disposed adjacent one of the open ends of the container holder and the other stop disposed adjacent the other open end of the container.

7. The deer feeder of claim 6 wherein the container holder is oriented at an angle of approximately 20° to 70° with respect to the support.

8. The deer feeder of claim 6 wherein at least one of the container stops is movable between first and second position such that in the first position the container can be inserted into the container holder and in the second position the stop acts to prohibit the container from exiting the container holder.

9. The deer feeder of claim 6 where the container holder includes a cylindrical sleeve.

10. The deer feeder of claim 9 wherein at least one of the stops is moveably mounted with respect to the sleeve and movable between first and second positions wherein in the first position the stop lies in the path of the container and prevents the container from exiting the sleeve, and in the second position the stop is spaced from the sleeve such that the container can be inserted or removed from the sleeve.

11. The deer feeder of claim 9 wherein the sleeve includes an axis that is disposed at an acute angle with respect to an axis of the post.

12. The deer feeder of claim 6 wherein the support includes an elongated post having a ground engaging portion adapted to be inserted into the ground such that when erected the container holder is disposed at a selected level above the ground.

13. The deer feeder of claim 12 including an anti-rotation member secured to the post and extending outwardly therefrom generally inhibiting the rotation of the post while a deer is feeding from the deer feeder.

14. A method of feeding deer, comprising:
  a. erecting a deer feeder by inserting an elongated post forming a part of the deer feeder into the ground;
  b. positioning a food container holder that forms a part of the deer feeder at a selected elevation above the ground, the food container holder being supported by the post;
  c. orienting the food container holder such that a first open end of the food container holder lies below a second open end of the food container holder;
  d. removing a top from a top portion of the food container such that food contained therein is accessible;
  e. inserting the food container into the food container holder such that the top portion of the food container lies below a bottom of the food container; and
  f. securing the food container in the food container holder such that a deer can gain access to food within the container.

15. The method of claim 14 including inserting the food container into one of the open ends of the food container holder and engaging the food container with a stop so as to secure the food container in the food container holder.

16. The method of claim 15 wherein the food container holder comprises a sleeve having opposed open ends and wherein the method includes inserting the food container into one open end of the sleeve and positioning at least one stop such that the stop engages the food container and secure the same within the sleeve.

17. The method of claim 16 wherein the sleeve is provided with a pair of stops and the method entails inserting the food container within the sleeve and engaging a top portion of the food container with a first stop, and engaging a bottom portion of the container with a second stop such that the first stop prevents the food container from falling from the sleeve and the second stop prevents the food container from being pushed from the sleeve.

18. The method of claim 14 including angling the food container holder downwardly such that when the food container is opened and held within the food container holder, the open food container faces generally downwardly where the food contained within the food container can be easily reached by a deer.

* * * * *